United States Patent
Katsuura et al.

(10) Patent No.: US 10,517,405 B2
(45) Date of Patent: Dec. 31, 2019

(54) SEAT WITH VENTILATION SYSTEM

(71) Applicant: NATIONAL UNIVERSITY CORPORATION CHIBA UNIVERSITY, Chiba-shi, Chiba (JP)

(72) Inventors: Tetsuo Katsuura, Chiba (JP); Yoshihiro Shimomura, Chiba (JP); Tomoyuki Takeuchi, Tokyo (JP); Hideo Tobata, Tokyo (JP); Tsutomu Fujikake, Tokyo (JP); Kazuyoshi Arata, Tokyo (JP)

(73) Assignees: TACHI-S CO., LTD., Tokyo (JP); NATIONAL UNIVERSITY CORPORATION CHIBA UNIVERSITY, Chiba-Shi (JP)

( * ) Notice: Subject to any disclaimer, the term of this patent is extended or adjusted under 35 U.S.C. 154(b) by 0 days.

(21) Appl. No.: 15/534,210

(22) PCT Filed: Dec. 14, 2015

(86) PCT No.: PCT/JP2015/084888
§ 371 (c)(1),
(2) Date: Jun. 8, 2017

(87) PCT Pub. No.: WO2016/104208
PCT Pub. Date: Jun. 30, 2016

(65) Prior Publication Data
US 2017/0340123 A1 Nov. 30, 2017

(30) Foreign Application Priority Data
Dec. 26, 2014 (JP) .................. 2014-265340

(51) Int. Cl.
*A47C 7/74* (2006.01)
*A47C 1/11* (2006.01)
(Continued)

(52) U.S. Cl.
CPC ............ *A47C 7/744* (2013.01); *A47C 1/11* (2013.01); *A61G 5/10* (2013.01); *B60N 2/5657* (2013.01)

(58) Field of Classification Search
CPC .......... A47C 7/744; A47C 7/742; A47C 7/74; B60N 2/5657; B60N 2/5621; B60N 2/5642; B60N 2/5607
(Continued)

(56) References Cited

U.S. PATENT DOCUMENTS 6,070,660 A * 6/2000 Byrnes .................. F04D 27/00
165/244
6,848,742 B1 * 2/2005 Aoki .................. B60N 2/5635
297/180.14
(Continued)

FOREIGN PATENT DOCUMENTS

JP 2003-300409 A 10/2003
JP 2004-283403 A 10/2004
(Continued)

*Primary Examiner* — Steven B McAllister
*Assistant Examiner* — Ko-Wei Lin
(74) *Attorney, Agent, or Firm* — Birch, Stewart, Kolasch & Birch, LLP (57) ABSTRACT

A seat with a ventilation system that maintains seated person's coolness by blowing air to minimum segments of a seatback and a seat cushion so that seated person's comfort is maintained is provided. Air-blowing means is controlled in air-blowing quantity and air-blowing time periodically by air-blowing control means, and air blowing in each period is set to include a first term T1 in which a predetermined quantity of air is blown and a second term T2 in which the predetermined quantity of air to be blown is gradually reduced.

15 Claims, 7 Drawing Sheets

(51) Int. Cl.
  *A61G 5/10*      (2006.01)
  *B60N 2/56*      (2006.01)
(58) Field of Classification Search
  USPC .......................................................... 454/120
  See application file for complete search history.

(56) References Cited

U.S. PATENT DOCUMENTS

2007/0197157 A1* 8/2007 Bellinger ............ F02B 29/0418
                                                    454/155
2007/0246975 A1* 10/2007 Bier ..................... B60N 2/5621
                                                    297/180.1

FOREIGN PATENT DOCUMENTS

| JP | 2005-245493 A | 9/2005 |
| JP | 2007-533252 A | 11/2007 |
| JP | 2012-126358 A | 7/2012 |
| JP | 2012-165830 A | 9/2012 |

\* cited by examiner

SEAT WITH VENTILATION SYSTEM

TECHNICAL FIELD

The present invention relates to a seat with a ventilation system including a seat cushion and a seatback and configured to blow air to the outside with air-blowing means from one or both of a seating surface of the seat cushion and a backrest surface of the seatback and, more specifically, to a seat with a ventilation system that provides a seated person with comfort by cyclically controlling an air-blowing quantity and an air-blowing time.

BACKGROUND ART

Seats to be used in vehicles, for medicals purposes, and for beauty or hairdressing purposes include seats with a ventilation system having air-blowing means integrated in the seat. Generally, a seated person is provided with comfort by blowing air generally continuously toward the seated person. However, improvement of seated person's comfort by blowing air intermittently has been proposed.

Examples of such a seat with a ventilation system include a configuration disclosed in JP-A-2003-299550 (PTL1), in which the seat with a ventilation system provides the seated person with comfort by causing control means to stop and operate the air-blowing means repeatedly to stimulate cold spots of the seated person's skin intermittently, so that the seated person feels enhanced coolness, and feeling temperature of the seated person is lower even though temperature in the vehicle is high.

CITATION LIST

Patent Literature

PTL1: JP-A-2003-299550

SUMMARY OF INVENTION

Technical Problem

The seat with a ventilation system of the related art as described above provides the seated person with comfort by repeating blowing and stop blowing intermittently. However, with such a control method based on intermittent blowing and stop blowing, the feeling temperature of the seated person is increased because no airflow occurs when air blowing is stopped. Consequently, a difference in the feeling temperature of the seated person between a state in which the air is blown and a state in which the air is not blown is increased, and thus the seated person cannot feel comfortable. Accordingly, there arises a drawback in that the comfort of the seated person cannot be maintained, and thus no satisfaction is achieved.

It is an object of the present invention to provide a seat with a ventilation system that is capable of maintaining seated person's comfort constantly by efficiently blowing air.

Solution to Problem

In order to achieve the above-described object, there is provided a seat with a ventilation system including a seat cushion and a seatback and configured to blow air to the outside with air-blowing means from one or both of a seating surface of the seat cushion and a backrest surface of the seatback, in which the air-blowing means is controlled in air-blowing quantity and air-blowing time cyclically by air-blowing control means, and air blowing in each cycle includes a first term in which a predetermined quantity of air is blown and a second term (T2) in which the predetermined quantity of air to be blown is gradually reduced. The first term includes a first term (T1') of a first cycle immediately after seating and first terms (T1) from the second cycle onward.

The seat with a ventilation system of this type provides the seated person with coolness by lowering temperature and moisture of a seat contact portion by blowing air to the seated person in a first term in which a predetermined quantity of air is blown. However, when air is continuously blown at a constant rate, a variation range in temperature and moisture at the seat contact portion is reduced, so that the seated person can hardly feel the effect of air blowing, and thus feels less comfortable. In contrast, when the air blowing is abruptly stopped, the temperature and moisture at the seat contact portion are significantly increased, which results in feeling of discomfort. Therefore, in the second term, the predetermined quantity of air to be blown is gradually reduced to maintain coolness of the seated person, and the air-blowing quantity and the air-blowing time are controlled cyclically in the first term and the second term, so that coolness of the seated person may be continued, which helps to maintain the seated person's comfort on a constant basis.

Right after being seated, when the seated person's skin temperature and the temperature and moisture in clothes are high, for example, in a hot day, the temperature and moisture at the seat contact portion also increase significantly. Therefore, the air-blowing time during the first term of the first cycle right after being seated may be increased to restrain increase in the temperature and moisture at the seat contact portion. If the air-blowing time is too long, however, a variation range in temperature and moisture at the seat contact portion is reduced, so that the seated person can hardly feel the effect of air blowing over time and thus feels less comfortable.

The air-blowing control means preferably varies the air-blowing quantity abruptly to the predetermined air-blowing quantity after the second term in which the air-blowing quantity is gradually reduced.

During the second term in which the air-blowing quantity is gradually reduced, the seated person's coolness is gradually lowered and the comfort is also degraded in accordance with reduction of the air-blowing quantity. Therefore, by increasing the air-blowing quantity abruptly to the predetermined air-blowing quantity in the first term, the temperature and moisture at the seat contact portion are lowered at a breath, and thus the seated person may feel coolness intensively and regain and stay in comfort.

Preferably, in the second term in which the air-blowing quantity is gradually reduced, air blowing is maintained on a consistent basis without stop.

In the second term in which the air-blowing quantity is gradually reduced, if the air blowing is stopped, the seated person does not feel coolness any longer. Therefore, by maintaining the air blowing on a consistent basis without stop, the seated person may feel coolness and stay in comfort.

Preferably, the second term (T2) is in a range longer than 15 seconds and shorter than 120 seconds. If the term in which the air-blowing quantity is gradually reduced is too short or too long, the effect of air blowing that the seated person feels gradually decreases over time, or a state in which the air-blowing quantity is small continues for a long time in the same manner as air blowing on a constant basis, which results in feeling of discomfort. Therefore, the term of continuous air blowing is preferably in a range longer than 15 seconds and shorter than 120 seconds.

The first term (T1) is preferably in a range longer than 15 seconds and shorter than 120 seconds. If the term of continuous air blowing is too short or too long, the effect of air blowing that the seated person feels gradually decreases, which results in feeling of discomfort. Therefore, the term of continuous air blowing is preferably in a range longer than 15 seconds and shorter than 120 seconds.

Right after being seated, when the seated person's skin temperature and the temperature and moisture in the clothes are high, for example, in a hot day, the feeling temperature may be lowered quickly to a feeling temperature that the seated person feels comfortable by increasing the first air-blowing term. However, if the air-blowing time is too long, the effect of air blowing that the seated person feels gradually decreases over time in the same manner as air blowing on a constant basis, and feeling of discomfort is eventually predominant. Therefore, the first term (T1') right after being seated is preferably in a range shorter than 240 seconds.

If a cycle including the first term in which a predetermined quantity of air is blown and the second term in which the predetermined air-blowing quantity is gradually reduced is too short or too long, the seated person may have a difficulty to maintain comfortable feeling temperature. Therefore, the cycle is preferably in a range longer than 30 seconds and shorter than 240 seconds.

Preferably, air is blown to a portion that corresponds to a thigh region of the seated person on a seating surface of the seat cushion.

Since cooling sensitivity on a lower half body of human being is high in a region near the thigh region, the seated person's comfort may be achieved efficiently by blowing air to the portion that corresponds to the thigh region.

Preferably, air is blown to one or both of a portion that corresponds to a shoulder region of the seated person and a portion that corresponds to a lumber region of the seated person on the backrest surface of the seatback.

Since the cooling sensitivity of an upper body of human being is high from the shoulder region to the lumber region, the seated person's comfort is efficiently provided by blowing air to one or both of the portion that corresponds to the shoulder region and the portion that corresponds to the lumber region of the seated person.

The air-blowing means is an electric air-blowing apparatus, the air-blowing control means preferably controls the number of rotation of the air-blowing means, and the air-blowing control means preferably controls a voltage to be applied to the air-blowing means. Alternatively, the air-blowing means is a compressor and the air-blowing control means preferably controls as aperture at a midsection of a flow channel.

Preferably, the air-blowing means is a compressor, and the air-blowing control means controls a pressure of the air-blowing means.

The present invention also provides a seat with a ventilation system including a seat cushion and a seatback and configured to blow air to the outside with air-blowing means from one or both of a seating surface of the seat cushion and a backrest surface of the seatback, in which the air-blowing means is cyclically controlled in air velocity and air-blowing time by air-blowing control means, and air blowing in each cycle includes a first term in which air is blown at a predetermined air velocity and a second term (T2) in which the predetermined quantity of air to be blown is gradually reduced, and the seat with a ventilation system of this type provides the seated person with coolness by lowering the temperature and moisture of a seat contact portion by blowing air to the seated person in the first term in which air is blown at a predetermined air velocity. However, when air is continuously blown at a constant rate, a variation range in temperature and moisture at the seat contact portion is reduced, so that the seated person can hardly feel the effect of air blowing, and thus feels less comfortable. In contrast, when the air blowing is abruptly stopped, the temperature and moisture at the seat contact portion are significantly increased, which results in feeling of discomfort. Therefore, in the second term, a predetermined air velocity is gradually lowered to maintain coolness of the seated person, and the air velocity and the air-blowing time are controlled cyclically in the first term and the second term, so that coolness of the seated person may be continued, which helps to maintain the seated person's comfort on a constant basis.

ADVANTAGEOUS EFFECTS OF INVENTION

According to the present invention, coolness of the seated person is continued by controlling the air-blowing quantity and the air-blowing time or the air velocity and the air-blowing time in the first term and the second term cyclically, and thus the seat with a ventilation system is provided in which the seated person's comfort is maintained.

DESCRIPTION OF EMBODIMENTS

An embodiment of the present invention will be described with reference to FIG. 1 to FIG. 8.

While a seat with a ventilation system of the present invention will be described in this example as a case of being used as a vehicle seat, for example, the seat with a ventilation system is not limited to the vehicle seat, and may be a seat to be used for beauty or hairdressing purposes and a seat for medicals purposes.

Figure 1:
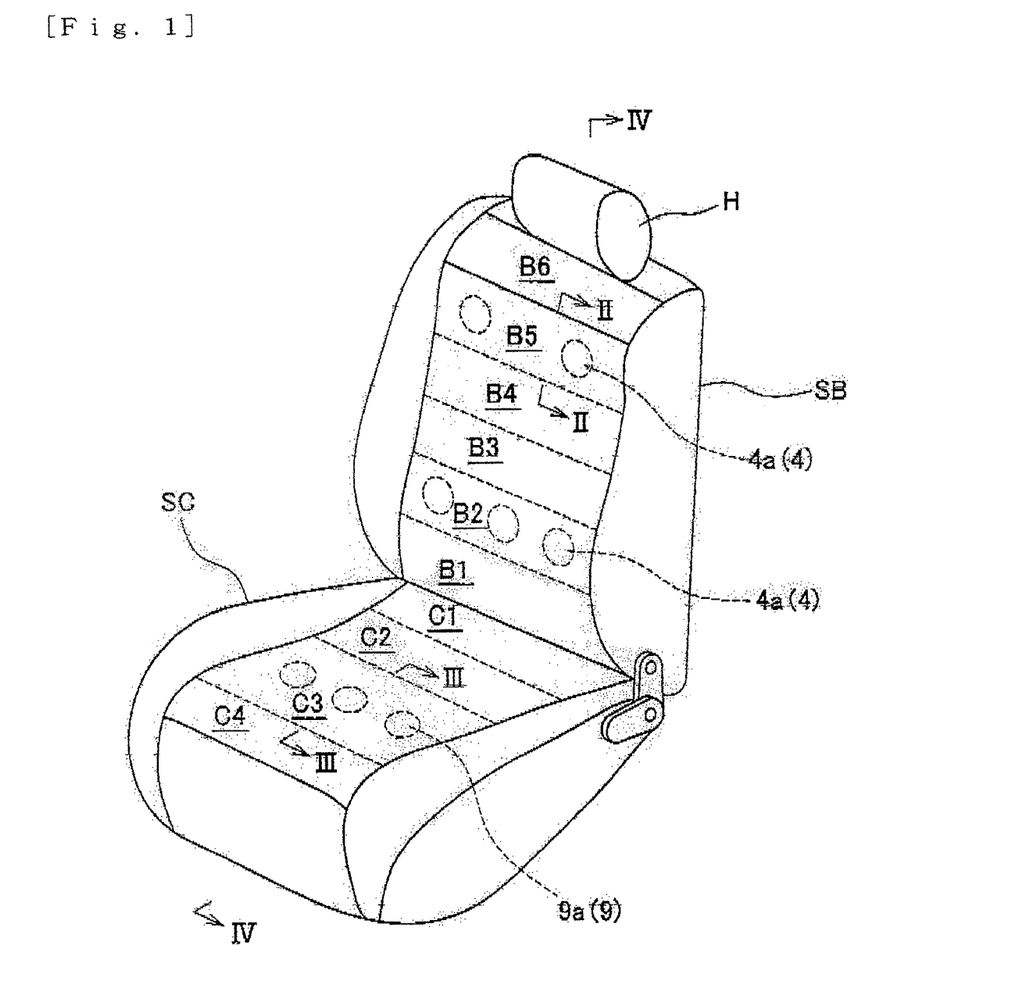
FIG. 1 is a perspective view of a seat with a ventilation system according to an embodiment of the present invention.

FIG. 1 illustrates a seat to be used in vehicles. A seatback SB is tiltably mounted on a seat cushion SC, and a headrest H is provided on a top of the seatback SB.

The seatback SB has a backrest surface divided into six segments in a vertical direction of the motor vehicle, and the segments are indicated, from a lower side of the motor vehicle, respectively by B1, B2, B3, B4, B5, and B6. The seat cushion SC has a seating surface thereof divided into four segments in a fore-and-aft direction of the motor vehicle, and the segments are indicated, from a rear side of the motor vehicle, respectively by C1, C2, C3, and C4.

The following description will be given on the assumption that the segments B1 to B6 of the backrest surface of the seatback SB illustrated in FIG. 1 correspond to a pelvic region, a lumber region, a back region, a shoulder blade region, a shoulder region, and a neck region as body parts of the seated person in sequence from a bottom of the motor vehicle, and the segments C1 to C4 of the seating surface of the seat cushion SC correspond to a rear half of the back region, a front half of the back region, a thigh region, and the region behind a knee as the body parts of the seated person in sequence from the rear side (seatback side) of the motor vehicle.

Figure 4:
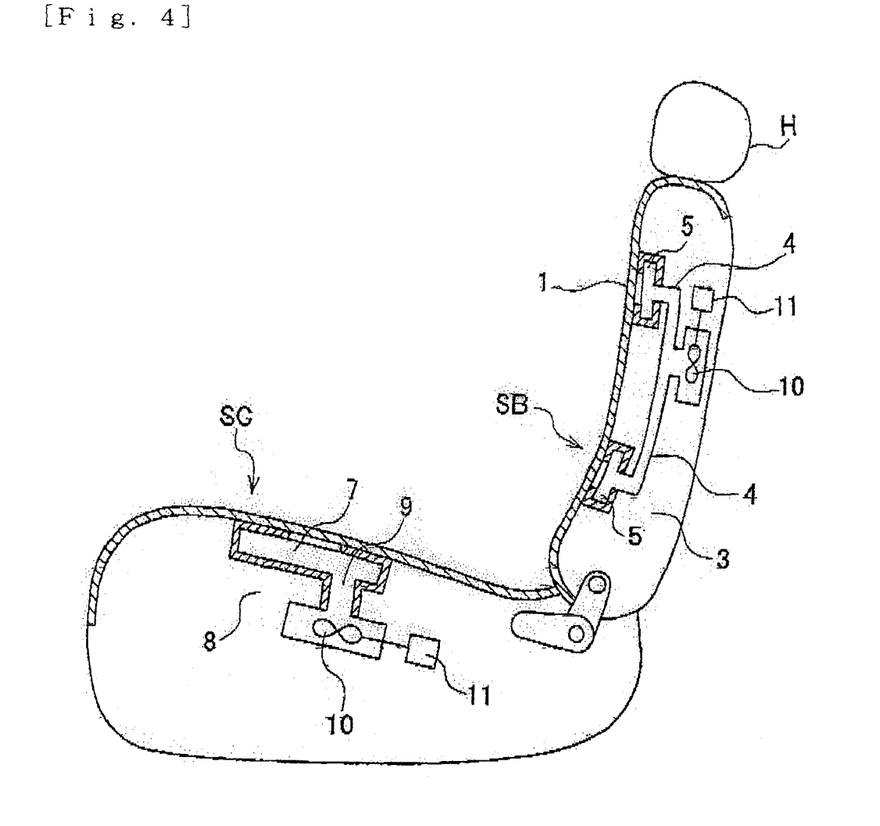
FIG. 4 is a partial cross-sectional view of a seatback of the seat with a ventilation system illustrated in FIG. 1, taken along the line IV-IV.

The vehicle seat as the seat with a ventilation system, as illustrated in FIG. 4, employs as air-blowing means an air-blowing machine 10, which is an electric air-blowing apparatus. The number of rotations and an air-blowing time of the air-blowing machine 10 are controlled by a control device 11, and the air-blowing machine 10 blows air both toward the backrest surface of the seatback SB and toward the seating surface of the seat cushion SC via airflow channels 4, 9. A blower or a fan is used as the air-blowing machine 10.

Figure 5:
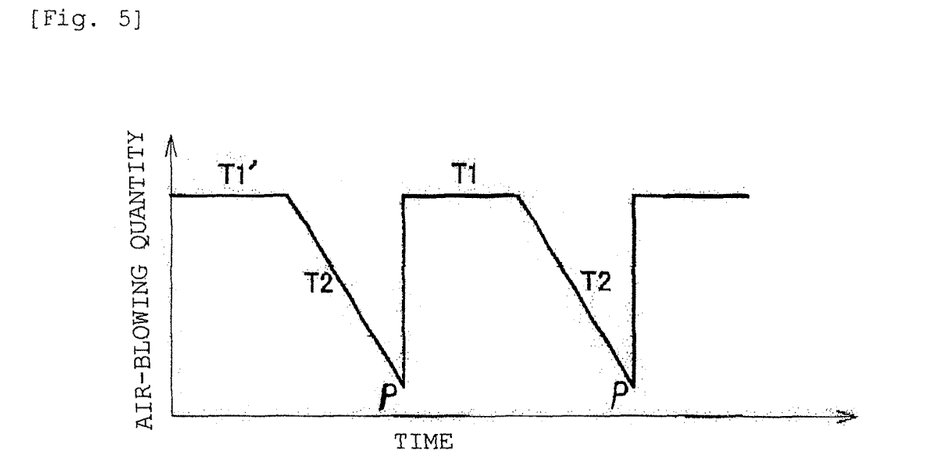
FIG. 5 is a graph of a relationship between an air-blowing quantity represented in cycle of air blowing and time according to the present invention.

The control device 11 controls air blowing and the air-blowing time of the air-blowing machine 10 cyclically as illustrated in FIG. 5.

The air blowing at each cycle includes a first term T1 in which a predetermined quantity of air is blown and a second term T2 in which the air-blowing quantity is gradually reduced from the predetermined quantity as illustrated in FIG. 5, and air is blown to both of the backrest surface of the seatback SB and the seating surface of the seat cushion SC continuously in cycles. While air is blown toward both of the backrest surface of the seatback SB and the seating surface of the seat cushion SC, a configuration in which air is blown to one of them is also applicable.

In this example, in the first term T1, a constant air of a quantity 0.47 $m^3$/sec is blown for 30 seconds from a surface of the seat. In the following second term T2, the number of rotations of the air-blowing machine is reduced to reduce the quantity of air gradually from 0.47 $m^3$/sec. The second term T2 is 30 seconds, and a total time of the first term T1 and the second term T2 is 60 seconds, which is repeated as one cycle from then onward.

The air-blowing machine 10 is provided on the seatback SB and the seat cushion SC, and air from the air-blowing machine 10 is delivered to the backrest surface of the seatback SB and the seating surface of the seat cushion SC, and then to the outside therefrom via the airflow channels 4, 9 formed in the seatback SB and the seat cushion SC. The quantity of air to be blown is controlled by varying the number of rotations of the air-blowing machine 10, for example, by controlling a voltage to be applied to the air-blowing machine 10.

In this example, the air-blowing machine 10 as the electric air-blowing apparatus is exemplified as the air-blowing means. However, the air-blowing machine 10 is not limited thereto, and a compressor may be used. In the case where the compressor is used as the air-blowing means, the air-blowing control means controls air blowing by the aperture and the pressure of the compressor.

Variable control of the number of rotations of the air-blowing machine 10 is not limited to controlling the voltage to be applied, and may be achieved by PWM control or may be achieved by any other appropriate means.

The seat illustrated in FIG. 1 has air-blowing areas of the seatback SB for delivering air from the air-blowing means to the outside of the backrest surface specified in a limited manner to the segment B5 that corresponds to the shoulder region and the segment B2 that corresponds to the lumber region of the seated person out of the six segments defined by dividing the backrest surface of the seatback SB in the vertical direction of the motor vehicle, and has an air-blowing area of the seat cushion SC for delivering air from the air-blowing means to the outside of the seated person specified in a limited manner to the segment C3 that corresponds to the thigh region of the seated person out of the four segments defined by dividing the seating surface of the seat cushion SC in the fore-and-aft direction, and is configured to blow air directly only to these specified air-blowing areas.

Specification of these air-blowing areas is achieved by providing predetermined air-blowing areas, that is, segments specified on the seatback SB and the seat cushion SC in a limited manner with air outlets 4a, 9a of the airflow channels in which air from the air-blowing means flows in line, and the air outlets of the airflow channels are provided, for example, respectively at a plurality of positions in the specified segments.

While air is blown to the segment C3 that corresponds to the thigh region of the seated person out of the four segments defined by dividing the seating surface of the seat cushion SC in the fore-and-aft direction, and the segment B5 that corresponds to the shoulder region and the segment B2 that corresponds to the lumber region of the seated person out of the six segments defined by dividing the backrest surface of the seatback SB in the vertical direction of the motor vehicle, it is needless to say that air may be blown from at least one of these segments and various combinations may be selected.

Figure 2:
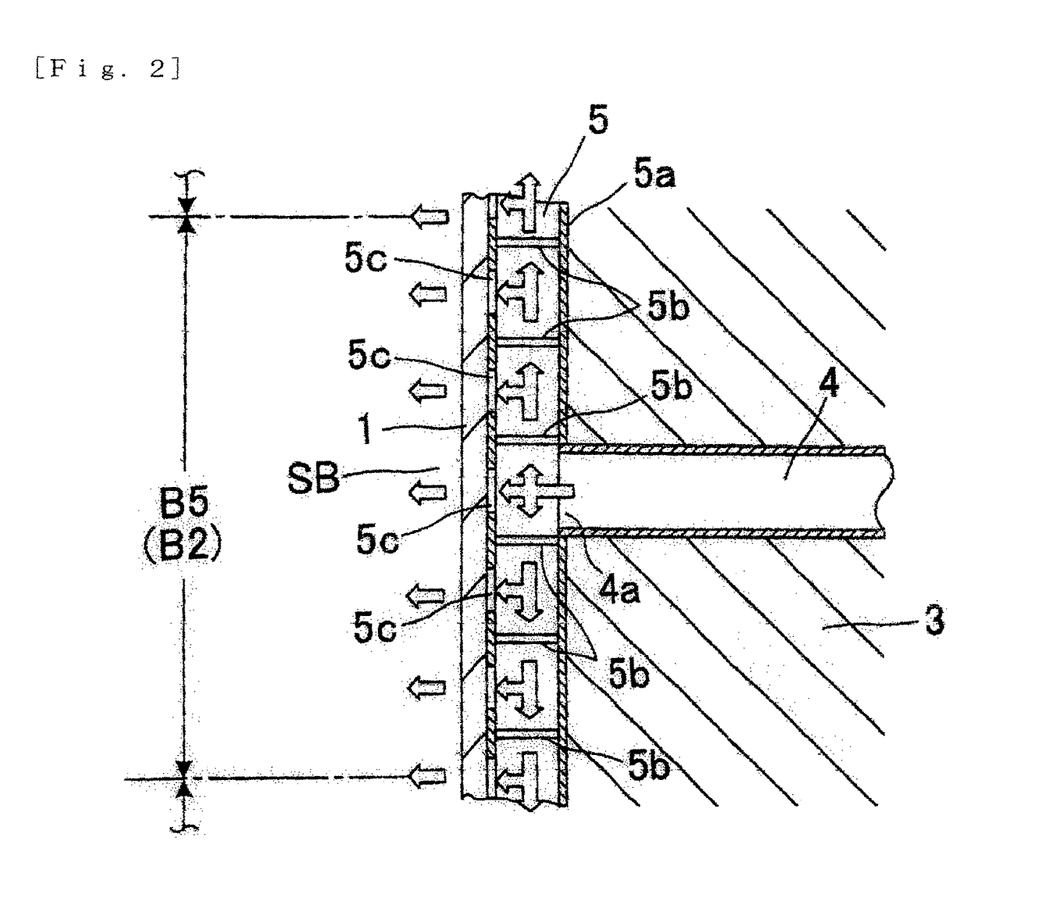
FIG. 2 is a partial cross-sectional view of the seat with a ventilation system illustrated in FIG. 1, taken along the line II-II.
Figure 3:
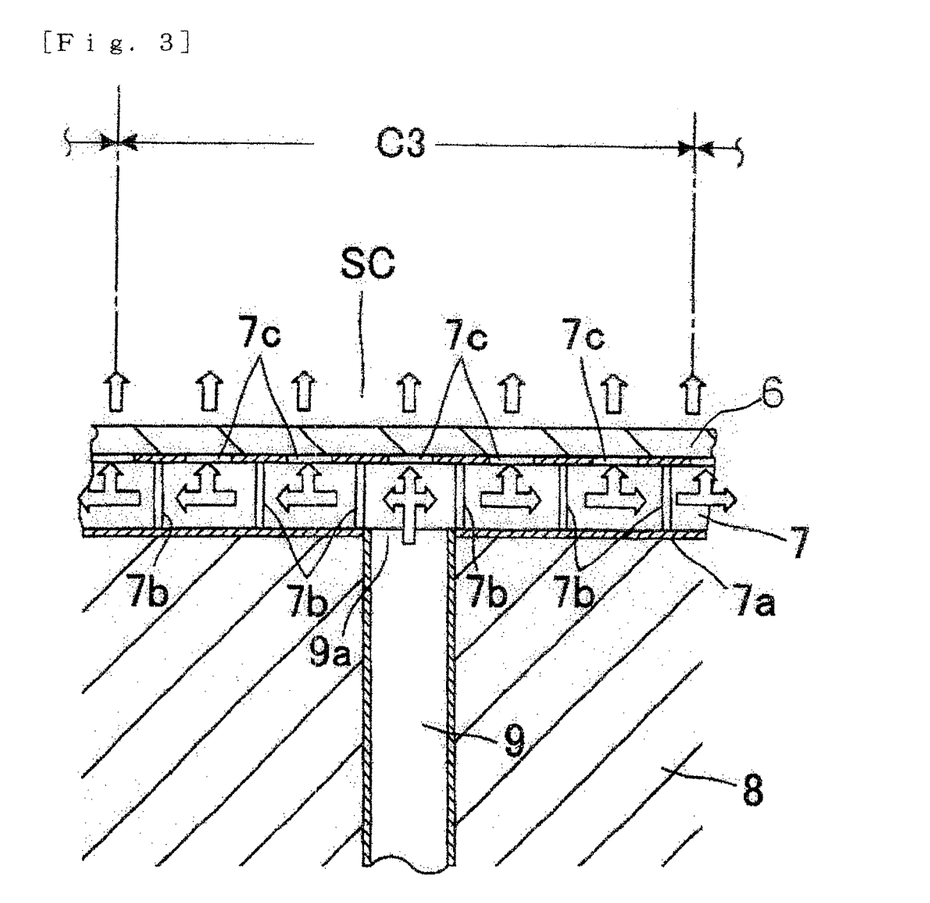
FIG. 3 is a partial cross-sectional view of a seat cushion of the seat with a ventilation system illustrated in FIG. 1, taken along the line III-III.

As illustrated in FIG. 2, the seatback SB includes the airflow channel 4 that communicates with the air-blowing machine 10, which is the air-blowing means, formed in a pad member 3 of the seatback SB, and the air outlet 4a formed so as to open toward the backrest surface, that is, a covering material 1 that lets air pass through. In the same manner as illustrated in FIG. 3, the seat cushion SC includes the airflow channel 9 that communicates with the air-blowing machine 10, which is the air-blowing means, formed in a pad member 8 of the seat cushion SC and the air outlet 9a formed so as to open toward the seating surface, that is, a covering material 6 that lets air pass through.

The air-blowing machine 10 is controlled by the control device 11 so that the air-blowing quantity and the air-blowing time are cyclically variable respectively as described above.

Here, the segment of the seatback SB that corresponds to the shoulder region of the seated person is described as one segment of the segment B5. However, any region including the segment B5 is acceptable, and the segment may extend beyond the segment B5 to at least one of the segments B6 and B4 on upper and lower sides, or the width of the segment B5 may be increased in the vertical direction to be wider than other segments.

In the same manner, the segment of the seat cushion SC that corresponds to the thigh region of the seated person, is described as the segment C3. However, any region including the segment C3 is acceptable and the segment may extend beyond the segment C3 to at least one of the segments C4 and C2 on front and rear sides, or the width of the segment C3 may be increased in the fore-and-aft direction to be wider than other segments.

The air-blowing means may have a configuration in which power is turned ON by the seated person operating a switch provided on the seat or on a dashboard, or a configuration in which power is automatically turned ON upon seating of a person or starting of an engine. The cycle, the first term T1 and the second term T2 may be controlled to be shorter and longer automatically in accordance with temperature in the cabin of the vehicle, or may be varied by the seated person selecting with a switch or the like.

In this example, since the segment B5 that corresponds to the shoulder region and the segment B2 that corresponds to the lumber region of the seatback SB, and the segment C3 that corresponds to the thigh region of the seat cushion SC are portions having high air-blowing efficiency, the seated person's sufficient comfort is ensured without being associated with air blowing to other portions.

In other words, according to this example, since the air-blowing efficiency for the seated person is achieved only by specifying the portion that corresponds to the shoulder region (segment B5) and the portion that corresponds to the lumber region (segment B2) of the seatback SB, and the portion that corresponds to the thigh region (segment C3) of the seat cushion SC, which are considered to have higher air-blowing efficiency for the seated person and blowing air only to these air-blowing areas, the range of the air-blowing areas is reduced without impairing the seated person's comfort, so that significant saving of power consumption is achieved.

Figure 6:
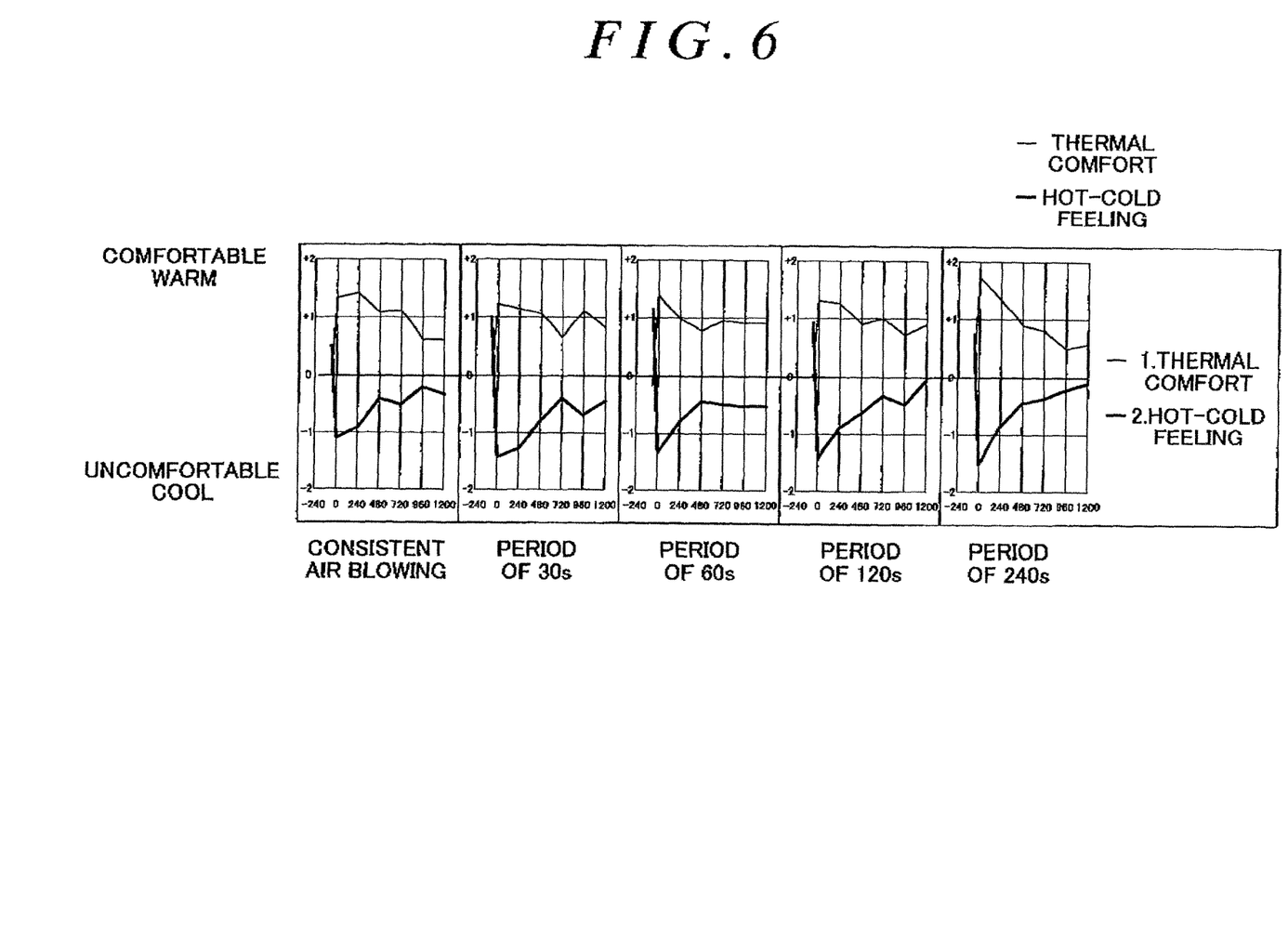
FIG. 6 is a graph of relationships between hot-cold feeling and thermal comfort of a test subject with time under respective cycle conditions according to the present invention.
Figure 7:
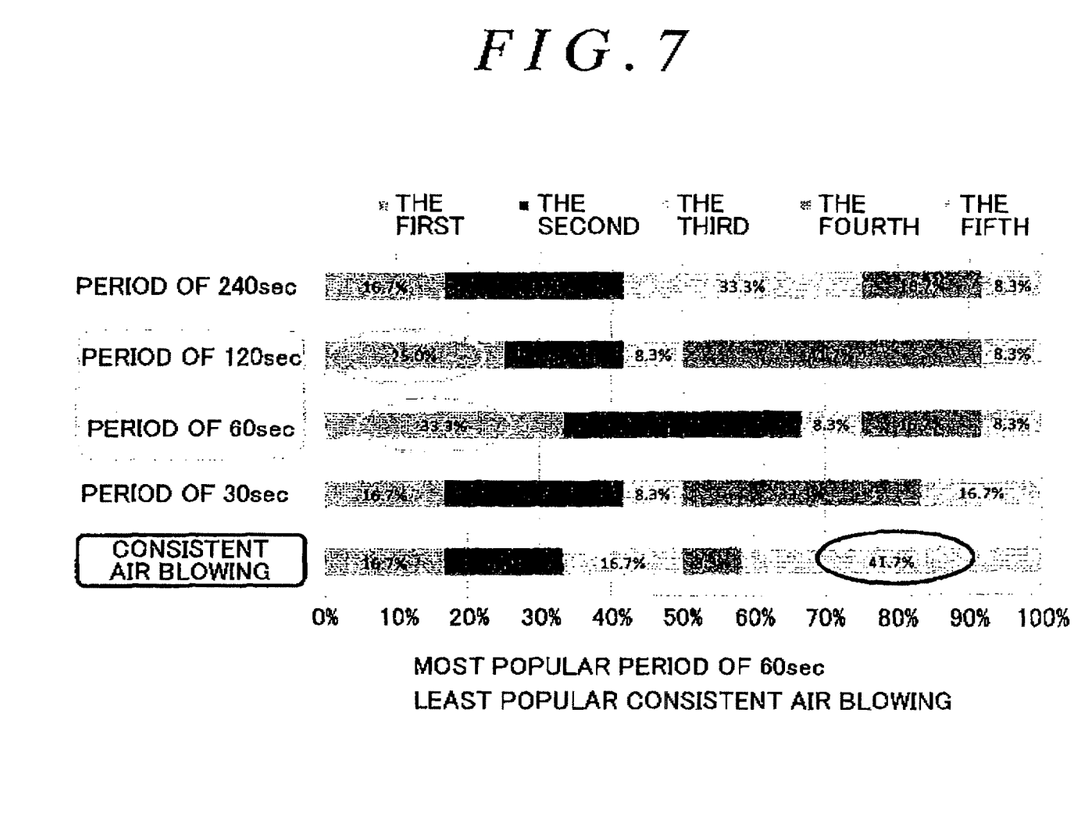
FIG. 7 is a graph of ratings of the respective cycle conditions by the test subjects according to the present invention.
Figure 8:
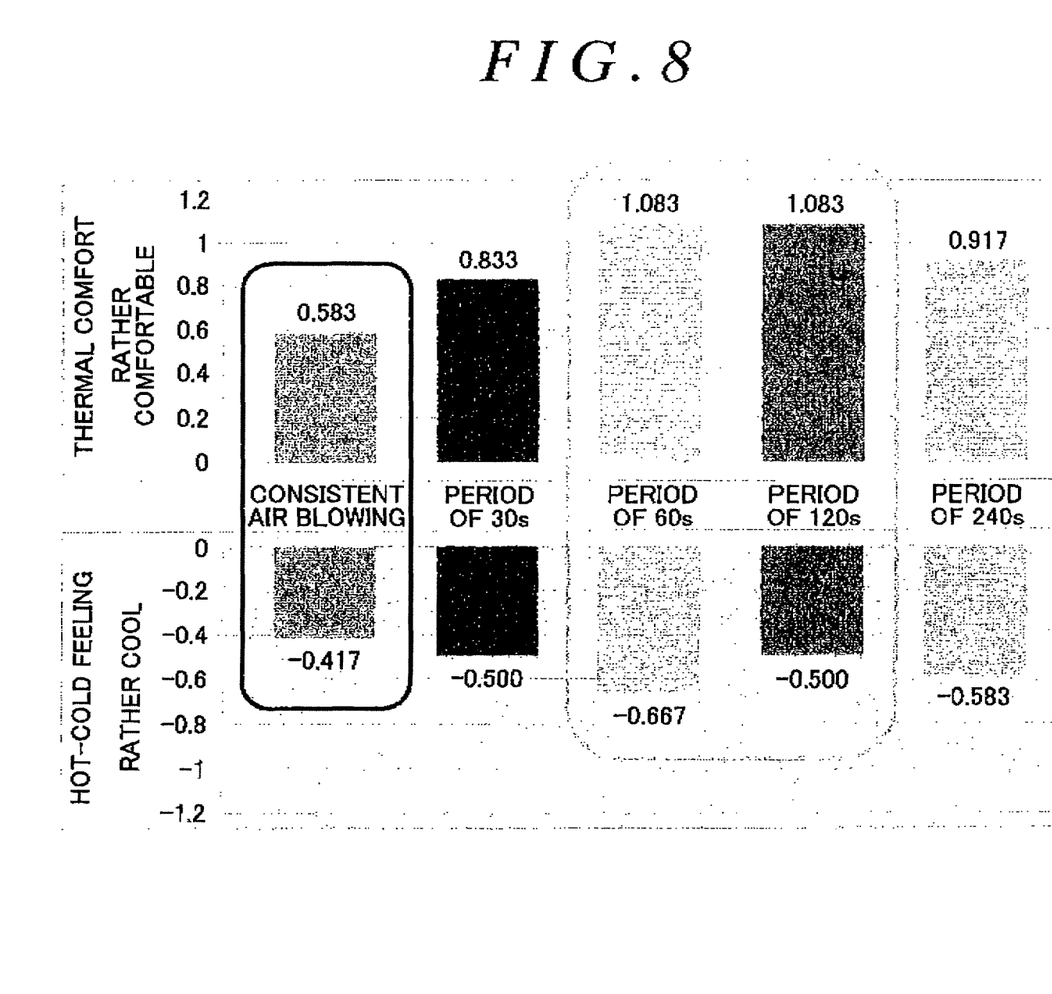
FIG. 8 is a graph of the hot-cold feeling and the thermal comfort felt by the test subject at 20 minutes after seating under the respective cycle conditions according to the present invention.

In addition, as experimental data of the present applicant is shown in FIG. 6 to FIG. 8, an outline of the experiment at that time will be described.

In an experimental seat, air was blown and delivered to three regions; the segment B5 that corresponds to the shoulder region and the segment B2 that corresponds to the lumber region of the seatback SB, and the segment C3 that corresponds to the thigh region of the seat cushion SC in a limited manner.

Air-blowing conditions were as follows. The seating time was determined to be 20 minutes under five patterns of conditions; a consistent air blowing in which a constant quantity of air is blown on a consistent basis (T1'=T1=∞, T2=0 second), 30 seconds period (T1'=T1=15 seconds, T2=15 seconds), 60 seconds (T1'=T1=30 seconds, T2=30 seconds), 120 seconds (T1'=T1=60 seconds, T2=60 seconds), and 240 seconds (T1'=T1=120 seconds, T2=120 seconds).

The first term T1 and the second term T2 were set respectively so that the total quantity of air became equivalent under the respective air-blowing conditions.

Under such conditions, thermal comfort and physiological response of seated persons, and physically efficient air-blowing conditions were examined.

As a result, in a graph in FIG. 6, a vertical axis represents the thermal comfort (comfort) and hot-cold feeling (warmness) by + and the thermal comfort (discomfort) and the hot-cold feeling (coolness) by −, and a lateral axis represents time, respectively. In the case of periods of 30 seconds, 60 seconds, and 120 seconds, the seated persons' thermal comfort (comfort) maintains a value around +1, and the hot-cold feeling (cool) is a little bit cool, so that the seated persons' comfort was maintained (see FIG. 6). In contrast, in the consistent air blowing, the thermal comfort is degraded over time, the hot-cold feeling increases, and in the period 240 seconds, the thermal comfort is degraded over time and the hot-cold feeling increases in the same manner as air blowing on a constant basis.

Accordingly, the seated persons felt comfortable in periods of 30 seconds, 60 seconds, and 120 seconds, more than in the consistent air blowing and the period 240 seconds.

FIG. 7 illustrates rating about which condition was good among the consistent air blowing and the periods of 30 seconds, 60 seconds, 120 seconds and 240 seconds declared by the seated persons in FIG. 6. The ratios at which the periods 60 seconds and 120 seconds were selected as the 1st place were high.

In FIG. 8, in the case of the consistent air blowing 20 minutes after being seated and the periods of 30 seconds, 60 seconds, 120 seconds and 240 seconds, the cases of the periods of 60 seconds and 120 seconds get the seated persons' support based on declaration of the seated persons' thermal comfort (comfort), and the hot-cold feeling (cool) compared with the cases of the consistent air blowing and the periods of 30 seconds and 240 seconds.

The first term T1 in which a predetermined quantity of air is blown is preferably in a range longer than 15 seconds and shorter than 120 seconds. If the term in which air is blown is shorter than 15 seconds, the seated person cannot feel sufficient comfort, and if it exceeds 120 seconds, the seated person's comfort is degraded. Therefore, the first term T1 is preferably in a range longer than 15 seconds and shorter than 120 seconds.

The second term T2 in which the air-blowing quantity is gradually reduced from the predetermined air-blowing quantity is preferably in a range longer than 15 seconds and shorter than 120 seconds. If the time in which the air-blowing quantity is gradually reduced is shorter than 15 seconds, the variation range in temperature and moisture at the seat contact portion is reduced, so that the effect of air blowing that the seated person feels gradually decreases over time and the comfort is degraded. If it is longer than 120 seconds, a state in which the air-blowing quantity is small continues for a long time in the same manner as air blowing on a constant basis, and discomfort is eventually predominant. Therefore, the second term T2 is preferably in a range longer than 15 seconds and shorter than 120 seconds.

Preferably, the first term T1' right after being seated is in a range shorter than 240 seconds. In the consistent air blowing as well, the comfort is maintained at a high level until 240 seconds after being seated, and the comfort is degraded from then on. Therefore, the first term T1' right after being seated is preferably in a range shorter than 240 seconds (see FIG. 6).

In the second term T2 in which the air-blowing quantity is gradually reduced from the predetermined air-blowing quantity, the air blowing is maintained on a consistent basis and continued without being stopped (see FIG. 5). Preferably, the air-blowing state is maintained at the last changing point P in the second term T2.

The reason is that by maintaining the air blowing on a consistent basis when the air-blowing quantity is gradually reduced in the second term T2, increase in temperature and moisture at the seat contact portion may be suppressed and degradation of the seated person's thermal comfort may be minimized.

When the term is switched to the first term T1 in which a predetermined quantity of air is blown after the second term T2 in which the air-blowing quantity is gradually reduced from the the predetermined air-blowing quantity, it is preferable to change the air-blowing quantity abruptly to the air-blowing quantity in the first term T1 after the changing point P in the second term T2. Since the air-blowing quantity is gradually reduced in the second term T2, the temperature and moisture at the seat contact portion is increased over time and thus the thermal comfort is gradually degraded. Therefore, if the air-blowing quantity is abruptly changed from the changing point P to that in the first term T1, the predetermined air-blowing quantity is abruptly achieved, so that even though the temperature and moisture at the seat contact portion is increased, the temperature and moisture at the seat contact portion is significantly reduced soon to provide comfort.

In this manner, by changing the air-blowing quantity and the air-blowing time periodically, the seated person can feel coolness continuously, and thus the seated person's comfort may be maintained.

Now, if a body of the seated person seated on the backrest surface of the seatback SB and the seating surface of the seat cushion SC comes into tight contact with the air outlets 4a, 9a, the body of the seated person blocks the air outlets of the airflow channels, and smooth airflow from the airflow channels 4, 9 may be impaired. Therefore, as illustrated in FIGS. 2 and 3, aerated layers 5, 7 that aerate air delivered from the air outlets 4a, 9a in a planar direction, that is, in a direction along the backrest surface of the seatback SB and the seating surface of the seat cushion SC, are preferably disposed between the air outlets of the airflow channels and the seated person, for example, the covering materials 1, 6. Examples of the aerated layers 5, 7 of this type that may be used include a planar aerating spacer provided with air permeable and flexible solid members 5b, 7b, which allow air to pass in bag members 5a, 7a formed of non-air-permeable material in the planar direction over an entire surface of the backrest surface (from B1 to B6) of the seatback SB and an entire surface of the seating surface (from C1 to C5) of the seat cushion SC. Air flowing in the aerated layer is discharged to the outside toward the seated person via vents 5c, 7c provided on the covering materials 1, 6 side of the bag members, whereby a smooth airflow into the air-blowing areas is secured. The vents 5c, 7c described above are required to be formed at positions that are not blocked by the seated person sitting thereon.

In this manner, with the aerated layers (aerating spacers) 5, 7 provided between the air outlets 4a, 9a of the airflow channels and the seated person, even when the seated person comes into tight contact with the backrest surface of the seatback SB and the seating surface of the seat cushion SC, air delivered from the air outlets of the airflow channels passes through the aerated layers and flows along with discharge from the vents 5c, 7c that are not blocked by the seated person. Therefore, a smooth airflow from the air-blowing means is secured and thus the seated person's comfort is further improved.

Here, the aerated layers 5, 7 are exemplified as the aerating spacers disposed between the air outlets 4a, 9a of the airflow channels and the covering materials 1, 6. However, since the aerated layers need only to be interposed between the air outlets of the airflow channels and the seated person, a configuration in which the aerated layers are provided on the front surface side of covering materials (the seated person side) is also applicable.

Here, the aerated spacers are exemplified as the aerated layers 5, 7. However, the aerated layers 5, 7 need only to allow air delivered from the air outlets 4a, 9a of the airflow channels to pass therethrough in the planar direction. For example, grooves may be formed on a surface of a pad member, or on the surface of the covering material and used the grooves as aerated layers for allowing air to flow through.

The grooves may be formed on a back surface of a pad. In this case, introduction holes that penetrate through the pad from the groove to the surface are provided.

The relationship between the air-blowing quantity and the air velocity will now be described. The surface area of the air outlet multiplied by the speed velocity is the air-blowing quantity. The lower the air velocity, the smaller the air-blowing quantity. In contrast, the higher the air velocity, the larger the air-blowing quantity. When the air-blowing quantity is constant, the air velocity is constant as well. When the air-blowing quantity is gradually reduced, the air velocity is gradually reduced. It is needless to say that the air velocity and the air-blowing quantity have a proportional relation, and when the air-blowing quantity varies, the air velocity also varies.

The present invention is not limited to the examples described above, and it is needless to say that various modifications in design may be made without departing claims.

REFERENCE SIGNS LIST

SB denotes a seatback.
SC denotes a seat cushion.
B3 denotes a portion that corresponds to a lumber region.
B5 denotes a portion that corresponds to a shoulder region.
C3 denotes a portion that corresponds to a thigh region.
4 and 9 denote airflow channels.
4a and 9a denote air outlets of the airflow channels
5 and 7 denote aerated layers.
10 denotes an air-blowing machine.
11 denotes a control device.

The invention claimed is:

1. A seat with a ventilation system comprising:
   a seat cushion and a seatback;
   an air-blower blowing air to an outside of one or both of a seating surface of the seat cushion and a backrest surface of the seatback;
   an air-blowing controller controlling the air-blower to control air-blowing quantity and air-blowing time cyclically,
   wherein, air blowing in each cycle includes a first term in which a predetermined quantity of air is blown and a second term in which the predetermined quantity of air to be blown is reduced over time, and
   wherein a period of the first term is the same as a period of the second term, and
   wherein each of the seat cushion and the seatback includes an aerated layer, to which the air from the air-blower is introduced, extending along a covering material of the seat cushion and the seatback, the aerated layer is divided into a plurality of segments by a plurality of spacers that allows air to pass between adjacent segments, and each segment includes a vent that discharges air supplied by the air-blower,
   wherein a period of the air blowing is longer than 30 seconds within a range shorter than 240 second, and wherein the air-blowing controller abruptly increases the quantity of air to the predetermined quantity of air to be blown in the first term at an end of the second term.

2. The seat with a ventilation system according to claim 1, wherein the air-blowing controller varies the air-blowing quantity to the predetermined air-blowing quantity after the second term in which the air-blowing quantity is gradually reduced.

3. The seat with a ventilation system according to claim 2, wherein in the second term in which the air-blowing quantity is reduced over time, and the air blowing is maintained throughout the second term.

4. The seat with a ventilation system according to claim 1, wherein the second term (T2) is in a range longer than 15 seconds and shorter than 120 seconds.

5. The seat with a ventilation system according to claim 1, wherein the first term (T1) is in a range longer than 15 seconds and shorter than 120 seconds.

6. The seat with a ventilation system according to claim 1, wherein the first term (T1') right after being seated is in a range shorter than 240 seconds.

7. The seat with a ventilation system according to claim 1, wherein air is blown to a portion that corresponds to a thigh region of a seated person on a seating surface of the seat cushion.

8. The seat with a ventilation system according to claim 1 wherein air is blown to one or both of a portion that corresponds to a shoulder region of the seated person and a portion that corresponds to a lumber region of the seated person on the backrest surface of the seatback.

9. The seat with a ventilation system according to claim 1, wherein the air-blower is an electric air-blowing apparatus, and the air-blowing controller controls the number of rotations of the air-blower.

10. The seat with a ventilation system according to claim 9, wherein the air-blowing controller controls a voltage to be supplied to the air-blower.

11. The seat with a ventilation system according to claim 9, wherein the air-blowing controller controls the air-blower by pulse-width-modulation (PWM).

12. The seat with a ventilation system according to claim 1, wherein the air-blower is a compressor, and the air-blowing controller controls an aperture at a midsection of a flow channel.

13. The seat with a ventilation system according to claim 1, wherein the air-blower is a compressor and the air-blowing controller controls a pressure of air from the compressor.

14. A seat with a ventilation system, comprising:
a seat cushion and a seatback;
an air-blower blowing air to an outside of one or both of a seating surface of the seat cushion and a backrest surface of the seatback: and
an air-blowing controller controlling the air-blower to control air velocity and air-blowing time cyclically,
wherein, the air velocity in each cycle includes a first term in which air is blown at a predetermined air velocity and a second term in which the predetermined air velocity of air to be blown is reduced over time, and
wherein a period of the first term is the same as a period of the second term, and
wherein each of the seat cushion and the seatback includes an aerated layer, to which the air from the air-blower is introduced, extending along a covering material of the seat cushion and the seatback, the aerated layer is divided into a plurality of segments by a plurality of spacers that allows air to pass between adjacent segments, and each segment includes a vent that discharges air supplied by the air-blower,
wherein a period of the air blowing is longer than 30 seconds within a range shorter than 240 second, and
wherein the air-blowing controller abruptly increases the quantity of air to the predetermined quantity of air to be blown in the first term at an end of the second term.

15. The seat with a ventilation system according to claim 14, wherein in the second term in which the air-blowing quantity is reduced over time, and the air blowing is maintained throughout the second term.

* * * * *